March 1, 1966  E. H. LUBER  3,237,457
GYROSCOPIC APPARATUS
Filed June 30, 1961
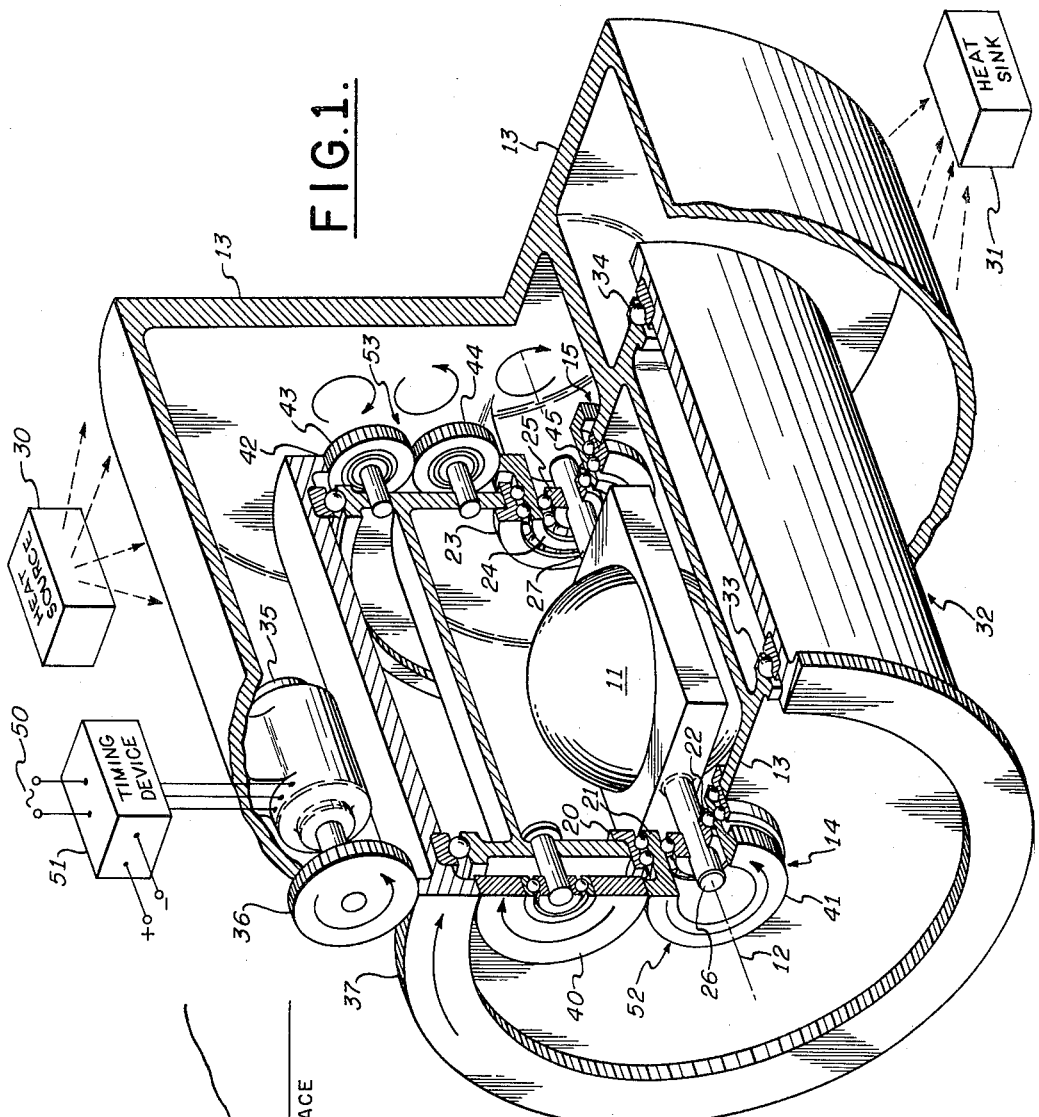
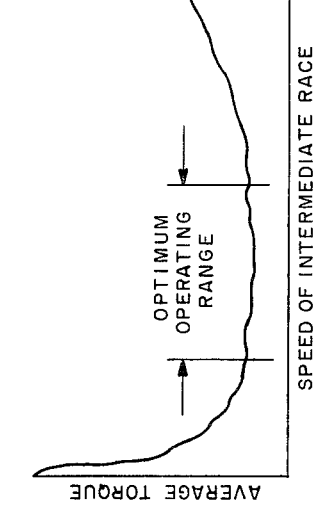
INVENTOR.
EDGAR H. LUBER
BY
ATTORNEY United States Patent Office 3,237,457
Patented Mar. 1, 1966

3,237,457
GYROSCOPIC APPARATUS
Edgar H. Luber, Forest Hills, N.Y., assignor to Sperry Rand Corporation, Great Neck, N.Y., a corporation of Delaware
Filed June 30, 1961, Ser. No. 121,187
10 Claims. (Cl. 74—5)

The present invention relates to apparatus for improving the accuracy of sensitive instruments such as gyroscopic instruments.

In extremely high accuracy devices, particularly gyroscopic apparatus, there is an increasing need for higher accuracy instruments primarily for inertial navigation purposes. In prior gyroscopic apparatus, the problem of drift of the gyroscope has been particularly troublesome and extensive efforts have been made to minimize drift as explained more fully in U.S. Patent No. 2,970,480 entitled "Anti-Friction Support Mechanisms for Gyroscopic Devices," issued February 7, 1961 in the name of Zeigler et al. The present invention is an improvement over the invention described in said U.S. Patent 2,970,480.

In the aforementioned U.S. patent, the gimbal supporting the gyroscopic sensitive element is in turn rotatably supported about its output axis by two spaced compound bearings mounted on opposite sides of the sensitive element. Each of the compound bearings has an outer race, an intermediate race and an inner race in which the intermediate race is rotated. The rotation of one intermediate race produces undesirable torques on the gimbal which are counteracted by rotating the intermediate race of the other compound bearing in the opposite direction with respect to the first. Periodic reversal of the rotation of the intermediate races averages both torques applied to the sensitive element and produces a very low net torque on the gyroscopic sensitive element resulting in extremely low drift rates as explained in the aforementioned patent. An efficacious means for transmitting motion to both intermediate races without unduly increasing the complexity is a problem in this type of gyroscope.

Another problem inherent in high performance inertial devices, such as gyoscropes, is the mass shift of the gyroscope and the elements associated therewith caused by temperature gradients across the diameter of the gyroscope. These diametral temperature gradients cause a shift in the center of gravity of the sensitive element which results in undesirable drift of the gyroscope. The present invention is an improvement over the thermal gradient attenuating device disclosed in U.S. application Serial No. 26,029 entitled "Temperature Gradient Attenuating Device," filed May 2, 1960, now Patent No. 3,129,755 in the names of Gould et al.

It is a primary object of the present invention to provide an extremely accurate device wherein diametral temperature gradients within the device are attenuated.

It is a further object of the present invention to provide a gyroscopic device wherein a single element performs the dual function of attenuating diametral temperature gradients and transmitting motion from one bearing means to another.

It is an additional object of the present invention to improved the accuracy of gyroscopic instruments of the type having compound bearings on opposite sides of the sensitive element with one portion of each bearing rotatable by providing a device which serves the dual purpose of transmitting motion from one compound bearing to another while simultaneously attenuating diametral temperature gradients with respect to the sensitive element.

The above objects are obtained by means of a hollow cylinder that is rotatable about and has its axis of symmetry coaxial with an axis of the gyroscope. The rotating cylinder is rotated about said gyroscopic axis for at least one complete revolution before reversing. The rotating cylinder is further arranged to rotate the intermediate races of the compound bearings in directions that are opposite with respect to each other. Thus, the rotating cylinder serves to transmit the rotating motion from one compound bearing of the gyroscope to the other compound bearing and also serves the additional function of attenuating diametral temperature gradients by distributing any external temperature gradient effect symmetrically around the gyroscopic apparatus.

These and other objects of the invention will become apparent from the following drawings in which:

FIG. 1 is a perspective partly in section of a mechanical schematic of a gyroscope including the motion transmitting and temperature gradient attenuating means of the present invention; and FIG. 2 is a graph of average torque versus speed of the intermediate race of a compound ball bearing.

Referring now to FIG. 1, the gyroscope 10 comprises a sensitive element 11 within which a gyro rotor, not shown, spins at a very high speed and is hermetically sealed. The sensitive element 11 is mounted for rotation around its output axis 12 on a frame 13 by means of spaced compound bearings 14 and 15, in a manner and for reasons fully disclosed in the aforementioned U.S. Patent 2,970,480. The compound bearing 14 comprises an outer race 20, an intermediate race 21 and an inner race 22 while the compound bearing 15 is similarly arranged having an outer race 23, an intermediate race 24 and an inner race 25. The compound bearings 14 and 15 are mounted on opposite sides of the sensitive element 11 and cooperative with trunnions 26 and 27 thereof respectively. For reasons briefly explained above and more fully explained in said U.S. Patent 2,970,480, the intermediate races 21 and 24 of the bearings 14 and 15 respectively are rotated in opposite directions with respect to each other and their direction of rotation is periodically and simultaneously reversed. The intermediate races 21 and 24 are rotated for at least one revolution and preferably more before their direction of rotation is reversed.

To accomplish the above and also to attenuate diametral temperature gradients caused by an external heat source 30 and/or an external heat sink 31, a rotatable hollow cylinder 32 surrounds the sensitive element 11 for at least the length of the sensitive element in the direction of the axis 12. The cylinder 32 is disposed intermediate the external temperature gradient caused by the heat source 30 and the heat sink 31 and the sensitive element 11. The cylinder 32 has its axis of symmetry coaxial with the axis 12 and is mounted for rotation around the axis 12 on the frame 13 by means of spaced bearings 33 and 34. The rotatable cylinder 32 is rotated about the axis 12 by a motor 35 which in turn is mounted on an extension of the frame 13. The motor 35 drives the cylinder 32 by means of a driving gear 36 that cooperates with the external gear teeth of a ring gear 37 that is integral with the cylinder 32 and has its axis of symmetry coaxial with the axis 12. The motion of the cylinder 32 is transmitted to the intermediate race 21 by means of an intermediate gear 40 mounted for rotation on the frame 13. The gear 40 meshes with the internal gear teeth of the ring gear 37 and a ring gear 41, the latter being integral with the intermediate race 21. By this arrangement the intermediate race 21 is rotated, for example, in a counterclockwise direction as indicated by the arrow during one period of rotation.

In order to provide rotation of the other intermediate race 24, the cylinder 32 extends along the axis 12 for a distance sufficient to cooperate with the intermediate race 24. The extremity of the cylinder 32 associated with the intermediate race 24 has a ring gear 42 integral with the cylinder 32. The internal gear teeth of the ring gear 42 cooperate with an intermediate gear 43 which in turn meshes with an idler gear 44 that drives the intermediate race 24 by means of a ring gear 45 integral therewith. The intermediate gear 43 and the idler gear 44 are mounted for rotation on the frame 13. The purpose of the idler gear 44 is to rotate the intermediate race 24 in a direction opposite to that with respect to the intermediate race 21, i.e., clockwise as indicated by the arrow during the period that the intermediate race 21 is rotating counterclockwise.

In order to reverse the direction of rotation of the cylinder 32 and thus the intermediate races 21 and 24, the motor 35 is connected to a source of power 50 through an electrical timing device 51 which may, for example, be a multivibrator that periodically reverses the polarity of the potential to the motor 35 thereby cyclically reversing the direction of rotation thereof.

The ring gear 37, intermediate gear 40 and ring gear 41 comprise a gear train 52 while the ring gear 42, intermediate gear 43, idler gear 44 and ring gear 45 comprise another gear train 53. The gear trains 52 and 53 are so constructed that the rotation of the motor 35 drives the intermediate race 21 at the same speed as that of the intermediate race 24 but in opposite directions with respect to each other. By reversing the direction of rotation of the motor 35, the directions of rotation of the intermediate races 21 and 24 are also simultaneously reversed. The number of revolutions through which the intermediate races 21 and 24 are rotated before being cyclically reversed and the speed at which they are rotated is dependent upon the theory fully explained in U.S. Patent 2,970,480.

Briefly, the optimum speed is in the range of substantially constant torque indicated on the graph of average torque versus speed of the intermediate race as shown in FIG. 2. Starting friction is high causing high initial average torque but falls rapidly as speed increases until substantially low average torque is reached with remains constant for a range of speed. At higher intermediate race speeds, i.e., above this range, viscous and dynamic forces cause further increases in average torque. The curve illustrates average running torques since instantaneous torques are quite erratic. The torque level varies for a given bearing as a function of its temperature, loading, cleanliness, etc.

Thus, to achieve an optimum low average torque, the intermediate races 21 and 24 are rotated at an appropriate constant speed within the speed range mentioned above in directions opposite with respect to each other with instantaneous reversal of rotation and for exactly the same number of revolutions per cycle. The speed selected should be in the constant torque range and should be higher than bearing motions which may be imposed by the motion of the chassis upon which the gyroscopic instrument 10 is mounted in order to insure that equal times are spent rotating clockwise and counterclockwise.

A ball bearing is also subject to purely random torques resulting either from actual dirt particles or from machining imperfections which are equivalent in effect to actual dirt. A static or quasi-static bearing may operate for long periods of time under the influence of a particular random disturbance. Any motion will improve this condition. Statistically, the amplitude of the random disturbance is not affected but the frequency of occurence is increased by bearing motion. Such action will average the random torques more quickly and allow less net random wander time. From this viewpoint, it is desirable to increase the speed of the intermediate races 21 and 24 until other undesirable effects are encountered.

It will be understood that the gyroscope 10 further includes means for spinning the rotor of the sensitive element, torquing means, pick-off means, temperature maintaining means and other elements depending upon the function which the gyroscope 10 is to serve which elements have not been disclosed for purposes of simplicity.

Referring again to FIG. 1, the diametral temperature gradient attenuating function of the cylinder 32 will now be explained. The heat source 30 shown to the left of the gyroscope 10 transmits heat, as indicated by the dotted arrows towards the left side of the gyroscope 10 as viewed in the drawing. A heat sink 31 disposed to the right of the gyroscope 10 absorbs heat, as indicated by the dotted arrows, from the right side of the gyroscope 10. The external temperature gradient caused by the heat source 30 and the heat sink 31 in the absence of the present invention would cause a temperature gradient across the diameter of the sensitive element 11. This undesirable temperature gradient would cause the left side of the sensitive element 11 to expand and the right side to contract thereby resulting in a mass shift changing the center of gravity of the sensitive element 11. This change in the center of gravity would introduce undesirable drift and cause an error in the output signal from the gyroscope 10.

The cylinder 32 minimizes this error by attenuating the diametral temperature gradient across the sensitive element 11. When the cylinder 32 rotates 180°, the portion that was adjacent the heat source 30 is now adjacent the heat sink 31 and vice versa thereby tending to cool the left side of the sensitive element 11 and warm the right side thereof. Further, with the cylinder 32 being constructed of a heat conductive material, the gradients tend to equalize within the cylinder 32 by conduction. Thus, the effect of the rotation of the cylinder 32 and the conduction therethrough tends to equalize the temperature on the left and right side of the sensitive element 11 thereby attenuating the diametral temperature gradients across the sensitive element 11. This minimizes the undesirable coercive torques on the sensitive element 11 which would otherwise result in an erroneous output signal.

Since the heat sources and heat sinks disposed external to the gyroscope 10 are not usually symmetrically disposed as shown in the drawing, in order for the cylinder 32 to perform the function of attenuating thermal gradients across the diameter of the sensitive element, the cylinder 32 must complete at least one revolution before reversing.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a sensitive element, first and second spaced bearing means disposed on opposite sides of said sensitive element for rotatably supporting said element about an axis, each of said bearing means having a portion thereof rotatable for reducing undesirable torques on said sensitive element, motion transmitting and temperature gradient attentuating means surrounding a least a portion of said sensitive element for attenuating diametral temperature gradients within at least the associated portion of said sensitive element in spite of temperature gradients external to said motion transmitting and temperature gradient attentuating means, said motion transmitting and temperature gradient attenuating means being disposed coaxial with and rotatable around said axis and arranged to simultaneously rotate the rotatable portions of said first and second bearing means, and means for rotating said motion transmitting and temperature gradient attenuating means around said axis and relative to said sensitive element and said external temperature gradients for maintaining a substantially uniform diametral temperature through said sensitive element and simultaneously rotating the rotatable portions of said first and second bearing means.

2. In combination, a sensitive element mounted for rotation about at least one axis thereof, first and second spaced suspension means disposed on opposite sides of said sensitive element for rotatably supporting said element about said axis, each of said suspension means having a portion thereof rotatable for reducing undesirable torques on said sensitive element, motion transmitting and temperature gradient attenuating means surrounding at least a portion of said sensitive element for attenuating diametral temperature gradients within at least the associated portion of said sensitive element in spite of temperature gradients external to said motion transmitting and temperature gradient attenuating means, said motion transmitting and temperature gradient attenuating means being disposed coaxial with and rotatable around said axis and arranged to simultaneously rotate the rotatable portions of said first and second suspension means, means coupled to said motion transmitting and temperature gradient attenuating means and said rotatable portions for rotating each of said rotatable portions in a direction opposite to the other rotatable portion, and means for rotating said motion transmitting and temperature gradient attenuating means around said axis and relative to said sensitive element and said external temperature gradients for maintaining a substantially uniform diametral temperature through said sensitive element and simultaneously rotating the rotatable portions of said first and second suspension means oppositely with respect to each other.

3. The combination recited in claim 2 including means for periodically reversing the direction of rotation of said means for rotating said motion transmitting and temperature gradient attenuating means thereby periodically and simultaneously reversing the direction of rotation of the rotatable portions of said first and second suspension means.

4. The combination recited in claim 2 including means for periodically reversing the direction of rotation of said motion transmitting and temperature gradient attenuating means whereby the direction of rotation of the rotatable portions of each of said first and second suspension means is periodically and simultaneously reversed.

5. In combination, a sensitive element mounted for rotation about at least one axis thereof, first and second spaced compound bearing means disposed on opposite sides of said sensitive element for rotatably supporting said element about said axis, each of said compound bearing means having an outer race, an intermediate race and an inner race with rolling members intermediate the adjacent races thereof, said intermediate races being rotatable for reducing undesirable torques on said sensitive element, hollow cylindrical motion transmitting and temperature gradient attenuating means surrounding at least a portion of said sensitive element for attenuating diametral temperature gradients within at least the associated portion of said sensitive element in spite of temperature gradients external to said motion transmitting and temperature gradient attenuating means, said motion transmitting and temperature gradient attenuating means having its axis of symmetry disposed coaxial with said one axis and being rotatable around said one axis and arranged to simultaneously rotate the intermediate races of said first and second compound bearing means, and means for rotating said motion transmitting and temperature gradient attenuating means around said one axis and relative to said sensitive element and said external temperature gradient for maintaining a substantially uniform diametral temperature through said sensitive element and simultaneously rotating said intermediate races.

6. The combination recited in claim 5 including means for periodically reversing the direction of rotation of said means for rotating said motion transmitting and temperature gradient attenuating means whereby the direction of rotation of said intermediate races is periodically and simultaneously reversed.

7. The combination recited in claim 5 including means associated with said motion transmitting and temperature gradient attenuating means and said intermediate races for rotating each one of said intermediate races in a direction opposite to the other one.

8. The combination recited in claim 7 including means for periodically reversing the direction of rotation of said means for rotating said motion transmitting and temperature gradient attenuating means whereby the direction of rotation of said intermediate races is periodically and simultaneously reversed.

9. In combination, a frame, a sensitive element mounted for rotation about at least one axis thereof, first and second spaced compound bearing means mounted on said frame on opposite sides of said sensitive element for rotatably supporting said element about said axis, each of said compound bearing means having an outer race, an intermediate race and an inner race with rolling members intermediate the adjacent races thereof, said intermediate races being rotatable for reducing undesirable torques on said sensitive element, a hollow cylinder rotatably mounted on said frame surrounding at least a portion of said sensitive element for attenuating diametral temperature gradients within at least the associated portion of said sensitive element in spite of temperature gradients external to said cylinder, said cylinder having its axis of symmetry disposed coaxial with said one axis and being rotatable around said one axis, a first gear train cooperative with said cylinder and one of said intermediate races for rotating said intermediate race around said one axis, a second gear train cooperative with said cylinder and the other intermediate race for rotating the other intermediate race about said one axis in a direction opposite with respect to that of the other intermediate race, and motive means for rotating said cylinder around said one axis and relative to said sensitive element and said external temperature gradient for maintaining a substantially uniform diametral gradient through said sensitive element and simultaneously rotating said intermediate races.

10. The combination recited in claim 9 including means for periodically reversing the direction of rotation of said motive means thereby reversing the direction of rotation of said cylinder and said intermediate races after said cylinder has traversed at least one revolution.

References Cited by the Examiner

UNITED STATES PATENTS 2,909,930  10/1959  Erdley et al. _____ 74—5 X
2,970,480   2/1961  Zeigler et al. _____ 74—5
3,053,099   9/1962  Bennett et al. _____ 74—5.4

BROUGHTON G. DURHAM, *Primary Examiner.*